United States Patent Office 2,755,309
Patented July 17, 1956

2,755,309
HYDRATION OF OLEFINS WITH TUNGSTEN AND TITANIUM OXIDES

Peter William Reynolds, Norton-on-Tees, England, and Laurence Roy Pittwell, Ottawa, Ontario, Canada, assignors to Imperial Chemical Industries Limited, a corporation of Great Britain No Drawing. Application October 30, 1953, Serial No. 389,457

6 Claims. (Cl. 260—641)

This application is a continuation-in-part of co-pending application Serial No. 77,678, filed February 21, 1949, now Patent No. 2,694,049, issued November 9, 1954.

The present invention relates to the production of alcohols by the direct catalytic hydration of the corresponding olefines.

In co-pending U. S. application, Serial No. 762,794, now abandoned, there is described and claimed a process for the production of isopropanol by reacting water and propylene, at elevated temperatures and pressures, in the presence of a catalyst containing a blue oxide of tungsten.

We have now found that catalysts which contain oxides of both tungsten and titanium in intimate admixture have markedly improved activity in the hydration of olefines. Such catalysts are also economically much more attractive than the known tungsten oxide catalysts which contain a higher percentage of the very costly tungsten oxide.

According to the present invention, therefore, there is provided a process for the direct catalytic hydration of olefines to the corresponding alcohols which comprises the step of reacting the olefines with water at elevated temperature and pressure in the presence of a catalyst comprising an intimate admixture of titanium oxide with a blue oxide of tungsten.

The olefines used in the process of this invention are selected from those having at most four carbon atoms per molecule. A particularly suitable catalyst is one containing about 20% of tungsten calculated as $WO_3$.

In this specification the expression "intimate admixture" is to be understood to mean the bringing together of the oxides of titanium and tungsten in close association by methods other than by the mechanical mixing of anhydrous titania with crystalline tungsten trioxide or tungstic acid.

The mere mixing of titanium dioxide with a blue oxide of tungsten, tungsten trioxide or tungstic acid before pelleting has been shown to produce only a slight increase in the activity of the tungsten compounds. Titanium oxide alone is relatively inactive.

The nature of the interaction of the intimate admixtures of titanium oxide and the tungsten oxide is not understood but the phenomenon is believed broadly to be that of promotion.

The catalysts of the present invention may be prepared in various ways, for example, by impregnating powdered, pelleted or extruded titania gel with ammonium paratungstate and heating in a reducing atmosphere (e. g. ethanol vapour or hydrogen) to convert the tungsten compound to a blue oxide of tungsten. The ammonium may be removed prior to reduction by ignition, but this is not essential; both steps may be carried out simultaneously. Owing to the low solubility of ammonium paratungstate it is, however, preferred to use ammonium metatungstate. Decatungstates and orthotungstates may also be used.

Another procedure, which gives a product containing in the unreduced state approximately equimolar proportions of titanium dioxide ($TiO_2$) and tungsten trioxide ($WO_3$), is to add an aqueous solution of ammonium metatungstate to one of titanium tetrachloride under suitable conditions to produce a gel which is then dried and heated to drive off ammonium chloride and reduced in a reducing atmosphere. The catalysts of the present invention may also be prepared by the intermediate formation of a solution of a heteropolyacid or a heteropolyacid salt containing titanium and tungsten in the acid radical, for example an ammonium titanotungstate or an ammonium tungstotitanate which is sprayed upon, or impregnated into, a suitable support, for example silica or titania, and then heated to drive off the ammonia and reduced in a reducing atmosphere.

The catalysts may also be prepared by impregnating titania with silicotungstic acid or by intimately mixing titania hydrogel with aqueous ammonium metatungstate or ammonium paratungstate and subsequently heating in a reducing atmosphere to reduce the tungsten compounds. Commercial rutile or anatase may, if desired, be used instead of titania gel.

It is preferable in all cases to avoid the use or presence of alkali metal compounds, or, if they have been used or are present, to effect very completely the removal of any residual alkali metals, as these are powerful poisons for the catalysts of this invention.

The pressure and temperature at which the process of this invention is operated depends on the particular olefine or olefines used. The pressures employed should however, be within the range of about 200 to about 500 atmospheres and the temperatures within the range of about 160° to about 350° C.

The process of the invention is illustrated by the following examples.

"Pass yield" is defined as the yield of desired product per pass through the converter calculated as a percentage of the theoretical yield of desired product corresponding to the quantity of olefine fed to the converter.

Example 1

This example illustrates the value of the catalyst of this invention in the hydration of propylene when compared with a pelleted titania gel and a tungstic acid catalyst.

Pelleted titania gel was prepared as follows:

4.75 kilograms of titanium tetrachloride were cautiously diluted by the addition of 100 mls. of distilled water, while being stirred. To this was added, with stirring, a slight excess of 0.88 aqueous ammonia to a final pH value of 9. The precipitated hydrogel was washed free of ammonium chloride, dried at 120° C. and then calcined for 4 hours at 400° C. The product was ground to pass 100 B. S. mesh sieve, i. e., 150μ, and, after the addition of 2% of graphite as a lubricant, was pelleted in the form of ⅛" x ⅛" cylinders under a pressure of 38 tons per square inch.

A pelleted tungsten oxide/titania gel catalyst containing 20% tungsten as $WO_3$ was prepared as follows:

3 kilograms of titania prepared as above were mixed into a paste with 1.3 kilograms of ammonium metatungstate in 1.35 litres of distilled water. The paste was dried at 120° C., and, after the addition of 3% of graphite as a pelleting lubricant, was pelleted in the form of ⅛" x ⅛" cylinders under a pressure of 32 tons per square inch.

The above materials and a sample of tungstic acid ($H_2WO_4$) similarly pelleted were reduced in ethanol vapour at 300° C. and atmospheric pressure and compared in propylene hydration at 190° and 230° C. under a total pressure of 250 atmospheres using a constant feed of 1.1 litres of water per litre of catalyst per hour and 2.2 litres (under 250 ats.) of propylene per litre of catalyst per hour. The pass yields of isopropanol obtained were as follows:

| Catalyst | Temperature, °C. | Percent Pass Yield, Isopropanol |
|---|---|---|
| Titania | 230 | Less than 2. |
| Tungstic acid | 230 | 12. |
|  | 190 | 6. |
| Tungsten oxide/Titania | 230 | 26. |
|  | 190 | 16.5. |

A small amount of polymerisation occurred in each case, but the loss of propylene in this manner was not excessive. The very high activity of the tungsten oxide on titania catalyst is evident from these results. It exhibited no evidence of deterioration after 200 hours' continuous operation, actually improving somewhat during the first 60 hours of operation to the activity shown in the above table.

*Example 2*

A tungsten oxide/titania catalyst was prepared and reduced as in Example 1 and employed in propylene hydration at 250° and 270° C. under 250 atmospheres' total pressure using a constant feed of 2.2 litres of water per litre of catalyst per hour and 0.7 litre of propylene per litre of catalyst per hour. The pass yields of isopropanol obtained were as follows:

| Temperature, °C. | Percent Pass Yield, Isopropanol |
|---|---|
| 250 | 53 |
| 270 | 47 |

*Example 3*

A concentrated aqueous solution of ammonium titanotungstate was prepared as follows:

200 grams of ammonium paratungstate were dissolved in distilled water and a quantity of quickly washed, freshly precipitated titania hydrogel, prepared as in Example 1, containing 15 grams of $TiO_2$, added to the solution. The mixture was boiled under reflux for 48 hours and a small amount of undissolved titania filtered off. The solution of ammonium titanotungstate was then concentrated by evaporation to a glassy mass.

1415 grams of titania granules prepared as in Example 1 were impregnated with a solution of 536 grams ammonium titanotungstate, prepared as above, in 400 ml. water. The product was dried at 120° C. and formed into ⅛" x ⅛" cylindrical pellets under a pressure of 50 tons per square inch using 2% of graphite as a lubricant.

The resulting catalyst was reduced in ethanol vapour as in Example 1 and employed in propylene hydration at 250° C. and 270° C. under 250 atmospheres' total pressure using a constant feed of 2.2 litres of water per litre of catalyst per hour and 0.7 litre of propylene per litre of catalyst per hour. The pass yields of isopropanol obtained were as follows:

| Temperature, °C. | Percent Pass Yield, Isopropanol |
|---|---|
| 250 | 49 |
| 270 | 40 |

*Example 4*

A tungsten oxide/titania catalyst containing 20% tungsten calculated as $WO_3$ was prepared by impregnating titania pellets, prepared as in Example 1, with ammonium metatungstate, drying the product at 120° C., calcining at 450° C. for four hours and forming into ⅛" x ⅛" cylindrical pellets under a pressure of 50 tons per square inch using 2% of graphite as a lubricant.

The catalyst was reduced in ethanol vapour and employed in ethylene hydration at 300° C. under 300 atmospheres' total pressure using a constant feed of 1.0 litre of water per litre of catalyst per hour and 1.2 litres of ethylene (at 300 ats.) per litre of catalyst per hour.

A pass yield of ethanol of 28% was obtained; the catalyst activity was unimpaired after 300 hours' use.

*Example 5*

A tungsten oxide/titania catalyst containing 20% tungsten calculated as $WO_3$ was prepared by impregnating titania calcined at 600° C. with the required quantity of aqueous ammonium tungstate, drying, calcining at 450° C. and, after adding 2% by weight of graphite as a lubricant, pelleting to form ⅛" x ⅛" cylinders under a pressure of 50 tons per square inch.

The catalyst was reduced in ethanol vapour and employed in ethylene hydration at 300° C. under 300 atmospheres total pressure using a constant feed of 1.0 litre of water per litre of catalyst per hour and a throughput of 0.098 kilogram of pure ethylene per litre of catalyst per hour. The weight feed ratio of water to ethylene was 10.2 and the molar feed ratio of water to ethylene was 15.9.

A pass yield of ethanol of 62% was obtained.

We claim:

1. A process for the hydration of olefines to produce the corresponding alcohols comprising the step of reacting an olefine, containing at most four carbon atoms per molecule, with water at a temperature within the range of 160° to 350° C. and a pressure within the range of 200 to 500 atmospheres in the presence of a catalyst which consists essentially of an intimate admixture of titanium oxide with a blue oxide of tungsten, the individual particles of the mixture containing both titanium oxide and the blue oxide of tungsten.

2. A process as claimed in claim 1 wherein the catalyst contains 20% tungsten expressed as $WO_3$.

3. The process of claim 1, in which the olefine is propylene.

4. The process of claim 1, in which the olefine is ethylene.

5. A process for the hydration of propylene to produce isopropanol comprising the step of reacting propylene with water at a temperature within the range 250° to 300° C. and a pressure of the order of 250 atmospheres in the presence of a catalyst which consists essentially of an intimate admixture of titanium oxide with a blue oxide of tungsten, the individual particles of the mixture containing titanium oxide and the blue oxide of tungsten.

6. A process as claimed in claim 5 wherein the catalyst contains 20% tungsten expressed as $WO_3$.

References Cited in the file of this patent

UNITED STATES PATENTS

| 1,682,242 | Patrick | Aug. 28, 1928 |
| 1,873,536 | Brown et al. | Aug. 23, 1932 |
| 1,998,220 | Brown | Apr. 16, 1935 |